United States Patent
Lin

(10) Patent No.: US 10,120,482 B2
(45) Date of Patent: Nov. 6, 2018

(54) DRIVING METHOD FOR IN-CELL TYPE TOUCH DISPLAY PANEL

(71) Applicant: Wuhan China Star Optoelectronics Technology Co., Ltd., Wuhan (CN)

(72) Inventor: Jianhong Lin, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 440 days.

(21) Appl. No.: 14/908,542

(22) PCT Filed: Dec. 29, 2015

(86) PCT No.: PCT/CN2015/099625
§ 371 (c)(1),
(2) Date: Jan. 29, 2016

(87) PCT Pub. No.: WO2017/067074
PCT Pub. Date: Apr. 27, 2017

(65) Prior Publication Data
US 2017/0255315 A1    Sep. 7, 2017

(30) Foreign Application Priority Data

Dec. 22, 2015   (CN) .......................... 2015 1 0699111

(51) Int. Cl.
*G06F 3/041* (2006.01)
*G09G 3/36* (2006.01)

(52) U.S. Cl.
CPC .......... *G06F 3/0416* (2013.01); *G06F 3/0412* (2013.01); *G09G 3/3677* (2013.01); *G09G 2300/0809* (2013.01); *G09G 2310/0286* (2013.01); *G09G 2310/08* (2013.01); *G09G 2320/043* (2013.01)

(58) Field of Classification Search
CPC ... G06F 3/0416; G06F 3/0412; G09G 3/3677; G09G 2300/0809; G09G 2310/08; G09G 2320/043
See application file for complete search history.

(56) References Cited

U.S. PATENT DOCUMENTS

2016/0266699 A1* 9/2016 Zhao .................... G09G 3/3677
2017/0039969 A1* 2/2017 Wang ................... G09G 3/3648
2017/0102814 A1* 4/2017 Xu ........................ G06F 3/0412

FOREIGN PATENT DOCUMENTS

CN          104021769 A      9/2014

* cited by examiner

*Primary Examiner* — Mark Edwards
(74) *Attorney, Agent, or Firm* — Leong C. Lei

(57) ABSTRACT

The invention provides a driving method for in-cell type touch display panel, by setting the touch scan signal (TP SCAN) turns on when n-th stage GOA unit finishing outputting a scan driver signal (G(n)) during displaying m-th frame, and during displaying (m+1)-th frame, setting the touch scan signal (TP SCAN) turns on when any stage GOA unit other than the n-th stage finishing outputting a scan driver signal (G(n)). The driving method makes the TFTs in GOA unit of each stage withstanding the voltage stress time and the ageing extent uniform to avoid any single stage ageing faster than the remaining to cause abnormal display in the known technologies.

9 Claims, 5 Drawing Sheets

Step 1: provide an in-cell type touch display panel using a GOA circuit for gate scan driving, the GOA circuit comprising a plurality of cascade GOA units; ─1

Step 2: for natural numbers m and n, during displaying an m-th frame, set a touch scan signal (TP SCAN) to turn on when an n-th stage GOA unit finishing outputting the scan driver signal (G(n)), the in-cell type touch display panel transiting from a display duration into a touch signal sensing duration; ─2

Step 3: during displaying an (m+t)-th frame, set a touch scan signal (TP SCAN) to turn on when a GOA unit of any stage other than the n-th stage finishing outputting the scan driver signal , the in-cell type touch display panel transiting from a display duration into a touch signal sensing duration. ─3

DRIVING METHOD FOR IN-CELL TYPE TOUCH DISPLAY PANEL

BACKGROUND OF THE INVENTION

1. Field of the Invention

The present invention relates to the field of display, and in particular to a driving method for in-cell type touch display panel.

2. The Related Arts

The gate driver on array (GOA) technology is the array substrate column drive technology, by using the thin film transistor (TFT) liquid crystal display (LCD) array processor to manufacture the gate scan driver circuit on the TFT array substrate to realize the column-by-column scan driving. The GOA technology has the advantages of low manufacture cost and the ability to realize narrow-border panels, and is used by many types of displays. GOA circuit has two basic functions: first, to output scan driving signal to drive the gate line in the panel to turn on the TFT in the display area so as to charge the pixels; and the second is the shift register; when the N-th scan driving signal is outputted, the clock control is used to perform outputting the (N+1)-th scan driving signal, and so on.

With the development of the low temperature poly-silicon (LTPS) semiconductor TFT, LTPS TFT liquid crystal display (LCD) attracts much attention. Because LTPS silicon crystal is more orderly arranged than non-crystal silicon, LTPS semiconductor shows a ultra-high carrier migration rate. The LCD utilizing LTPS TFT has the advantages of high resolution, rapid response, high luminance, and high opening ratio. Correspondingly, the integrated circuit (IC) around the panel of LTPS TFT LCD also becomes a focus of the display technology. The gate driver on array (GOA) technology is the array substrate column drive technology, by using the thin film transistor (TFT) liquid crystal display (LCD) array processor to manufacture the gate scan driver circuit on the TFT array substrate to realize the column-by-column scan driving. The GOA technology has the advantages of low manufacture cost and the ability to realize narrow-border panels, and is used by many types of displays. GOA circuit has two basic functions: first, to output scan driving signal to drive the gate line in the panel to turn on the TFT in the display area so as to charge the pixels; and the second is the shift bit saving; when the N-th scan driving signal is outputted, the clock control is used to perform outputting the (N+1)-th scan driving signal, and so on.

The embedded touch technology is to integrate the touch panel with the liquid crystal (LC) panel, and embed the function of the touch panel to the LC panel so that the LC panel can both display and sense the touch to input. As the display technology rapidly grows, the touch panel is widely accepted and used, such as, smart phone, tablet, and so on.

The current embedded technology can be categorized in two types. The first type is the on-cell type and the other is in-cell type.

In the known technologies, the in-cell type touch display panel realize the sensing of the touch signals in the display duration or the blanking duration. Take the GOA circuit with a plurality of N-type TFT as an example. The operation timing of known driving method for in-cell type display panel is shown in FIG. 1. During displaying a frame, the touch scan signal TP SCAN turns on at the point when the n-th stage GOA unit finishes outputting the scan driver signal G(n), i.e., activating the touch signal sensing. After the touch scan signal TP SCAN turns on, the clock signal CK and the inverted clock signal XCK both are pulled down to the low level.

As shown in FIG. 2, the GOA circuit comprises a plurality of cascade GOA units, each stage GOA unit inputs a clock signal CK, an inverted clock signal XCK, and a constant negative voltage VSS, and outputs a corresponding scan driver signal. FIG. 3 and FIG. 4 shows examples of the GOA circuit of the n-th stage GOA unit respectively. In FIG. 3, the first node Q(n) is first pulled down to the level of the scan driver signal G(n), then pulled down by the scan driver signal G(n) to the level of constant negative voltage VSS. In FIG. 4, the first node Q(N) and the scan driver signal G(n) are both pulled down directly to the level of the constant negative voltage VSS.

Refer to FIG. 1 and FIG. 2. In general, before the touch scan signal TP SCAN is turned on, the high level of the first node of each stage GOA unit maintains at the high level of the first node of the GOA of the previous stage. However, when the touch scan signal TP SCAN is turned on, the first node Q(n) and Q(n+1) of the GOA units of the previous stage and the next stage neighboring the rising edge of the touch scan signal TP SCAN will be dragged, which will cause the first node of the GOA units of the previous stage and the next stage neighboring the rising edge of the touch scan signal TP SCAN to form different voltage waveform. The difference in voltage holding time will cause different extent of electricity leakage, and the TFT having different time under the voltage stress will also cause different extent of ageing in TFT. Therefore, in addition to the abnormal display generated by the scan driver signal difference from the GOA units of the other stages cause by leakage, the TFT ageing in the GOA units of previous and the next stages will also shorten the lifespan of the circuit.

SUMMARY OF THE INVENTION

The object of the present invention is to provide a driving method for in-cell type touch display panel, able to make the TFT ageing in each GOA unit uniform to avoid the TFT in a single stage GOA unit from staying under the stress longer to cause the circuit excessive ageing, leading to abnormal display.

To achieve the above object, the present invention provides a driving method for in-cell type touch display panel, which comprises: Step 1: providing an in-cell type touch display panel, the in-cell type touch display panel using a GOA circuit for gate scan driving, the GOA circuit comprising a plurality of cascade GOA units, the GOA unit of each stage inputting a clock signal, an inverted clock signal, and a constant voltage, and outputting a scan driver signal to the GOA unit of corresponding stage; the first stage GOA unit inputting a scan activation signal; Step 2: for natural numbers m and n, during displaying an m-th frame, setting a touch scan signal to turn on when an n-th stage GOA unit finishing outputting the scan driver signal, the in-cell type touch display panel transiting from a display duration into a touch signal sensing duration; and Step 3: during displaying an (m+t)-th frame, setting a touch scan signal to turn on when a GOA unit of any stage other than the n-th stage finishing outputting the scan driver signal, the in-cell type touch display panel transiting from a display duration into a touch signal sensing duration.

Optionally, the GOA unit of each stage comprises a plurality of N-type TFTs; the constant voltage is a constant negative voltage, the touch scan signal turns on when transiting from low level to high level, the scan activation signal comprises a single high level pulse, the clock signal and the inverted clock signal comprises a plurality of high level pulses during the display duration of each frame, and pulled down to low level during the touch signal sensing duration of each frame.

Optionally, the GOA unit of each stage comprises a plurality of P-type TFTs; the constant voltage is a constant positive voltage, the touch scan signal turns on when transiting from high level to low level, the scan activation signal comprises a single low level pulse, the clock signal and the inverted clock signal comprises a plurality of low level pulses during the display duration of each frame, and pulled up to high level during the touch signal sensing duration of each frame.

Optionally, the n-th stage GOA unit comprises: a pre-charged control module, a pull-down control module, a first TFT, a second TFT, a third TFT, and a capacitor; the pre-charged control module having an input end connected to input the scan driver signal of the previous stage ((n−1)-th stage) GOA unit, an output end connected to the first node; the gate of the first TFT connected to an output end of the pull-down control module, the source connected to the first node, and the drain connected to the scan driver signal of the n-th stage GOA unit; the gate of the second TFT connected to the first node, the drain connected to the scan driver signal of the n-th stage GOA unit; the gate of the third TFT connected to the gate of the first TFT, the source connected to the constant voltage, and the drain connected to the scan driver signal of the n-th stage GOA unit; one end of the capacitor connected to the first node and the other connected to the scan driver signal of the n-th stage GOA unit; and for any two GOA units of adjacent stages, one of the two GOA units having the input end of the pull-down control module connected to the clock signal and the source of the second TFT connected to the inverted clock signal, while the other GOA unit having the input end of the pull-down control module connected to the inverted clock signal and the source of the second TFT connected to the clock signal.

Optionally, the n-th stage GOA unit comprises: a pre-charged control module, a pull-down control module, a first TFT, a second TFT, a third TFT, and a capacitor; the pre-charged control module having an input end connected to input the scan driver signal of the previous stage ((n−1)-th stage) GOA unit, an output end connected to the first node; the gate of the first TFT connected to an output end of the pull-down control module, the source connected to the first node, and the drain connected to the constant voltage; the gate of the second TFT connected to the first node, the drain connected to the scan driver signal of the n-th stage GOA unit; the gate of the third TFT connected to the gate of the first TFT, the source connected to the constant voltage, and the drain connected to the scan driver signal of the n-th stage GOA unit; one end of the capacitor connected to the first node and the other connected to the scan driver signal of the n-th stage GOA unit; and for any two GOA units of adjacent stages, one of the two GOA units having the input end of the pull-down control module connected to the clock signal and the source of the second TFT connected to the inverted clock signal, while the other GOA unit having the input end of the pull-down control module connected to the inverted clock signal and the source of the second TFT connected to the clock signal.

Optionally, in Step 3, the touch scan signal is set to turn on when a GOA unit of any stage before the n-th stage finishing outputting the scan driver signal.

Optionally, in Step 3, the touch scan signal is set to turn on when a GOA unit of any stage after the n-th stage finishing outputting the scan driver signal.

Preferably, in Step 3, the touch scan signal is set to turn on when a GOA unit of the previous stage ((n−1)-th stage) before the n-th stage finishing outputting the scan driver signal.

The present invention also provides a driving method for in-cell type touch display panel, which comprises: Step 1: providing an in-cell type touch display panel, the in-cell type touch display panel using a GOA circuit for gate scan driving, the GOA circuit comprising a plurality of cascade GOA units, the GOA unit of each stage inputting a clock signal, an inverted clock signal, and a constant voltage, and outputting a scan driver signal to the GOA unit of corresponding stage; the first stage GOA unit inputting a scan activation signal; Step 2: for natural numbers m and n, during displaying an m-th frame, setting a touch scan signal to turn on when an n-th stage GOA unit finishing outputting the scan driver signal, the in-cell type touch display panel transiting from a display duration into a touch signal sensing duration; and Step 3: during displaying an (m+t)-th frame, setting a touch scan signal to turn on when a GOA unit of any stage other than the n-th stage finishing outputting the scan driver signal, the in-cell type touch display panel transiting from a display duration into a touch signal sensing duration; the GOA Unit of each stage comprises a plurality of N-type TFTs; wherein in Step 3, the touch scan signal is set to turn on when a GOA unit of any stage before the n-th stage finishing outputting the scan driver signal, wherein in Step 3, the touch scan signal is set to turn on when a GOA unit of the previous stage ((n−1)-th stage) before the n-th stage finishing outputting the scan driver signal.

Compared to the known techniques, the present invention provides the following advantages: the present invention provides a driving method for in-cell type touch display panel, for different frames, setting the touch scan signal to turn on when the GOA units of different stages finishing outputting scan driver to make the TFT in GOA unit of each stage withstanding the voltage stress time and the ageing extent uniform to avoid any single stage ageing faster than the remaining to cause abnormal display in the known technologies.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 2:
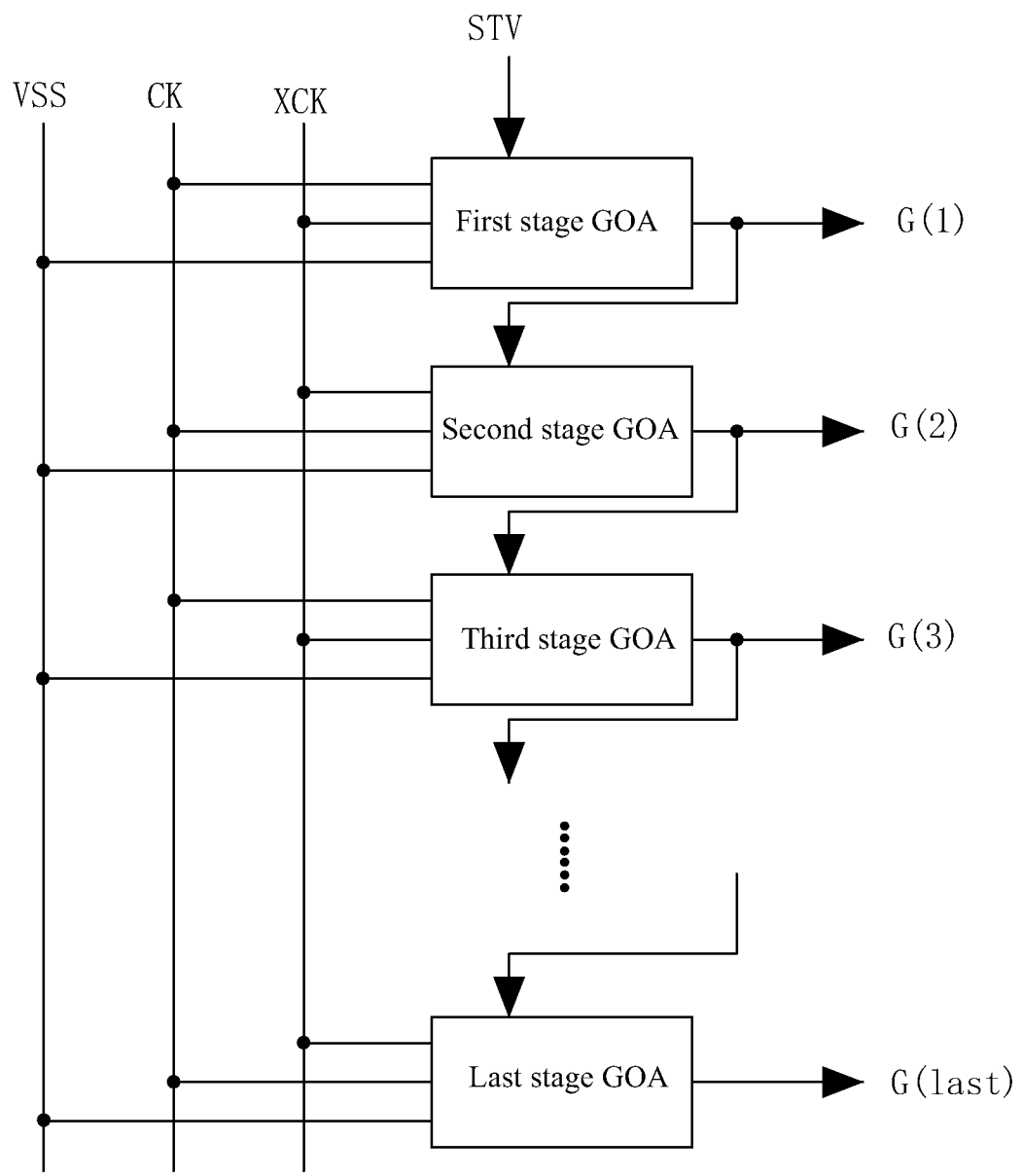
FIG. 2 is a schematic view showing the connection of the GOA circuit and external signals.
Figure 5:
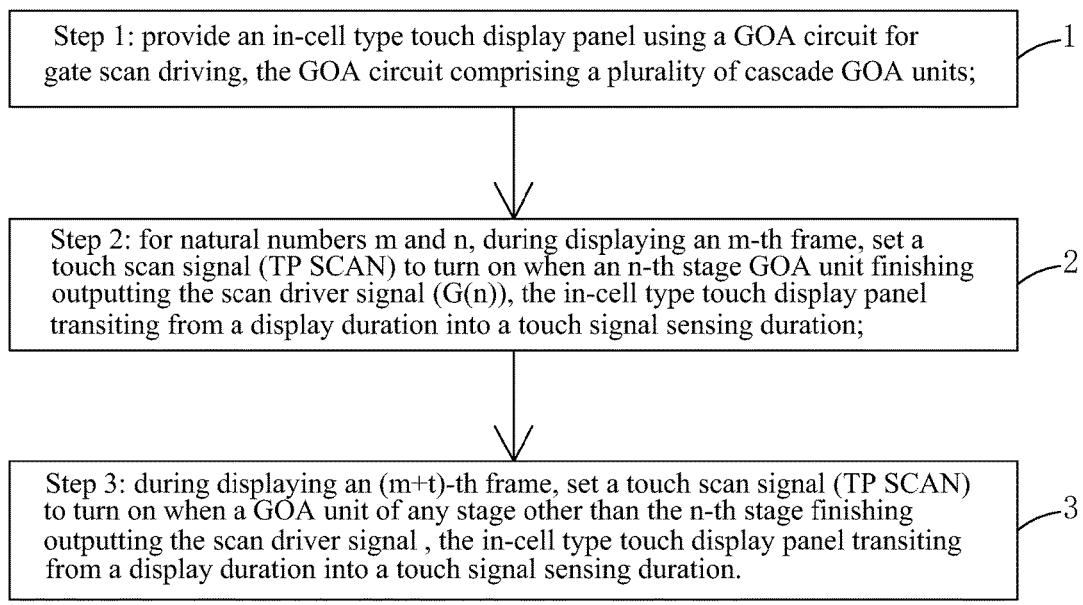
FIG. 5 is a schematic view showing the flowchart of the driving method for in-cell type touch display panel provided by the an embodiment of the present invention.
Figure 6:
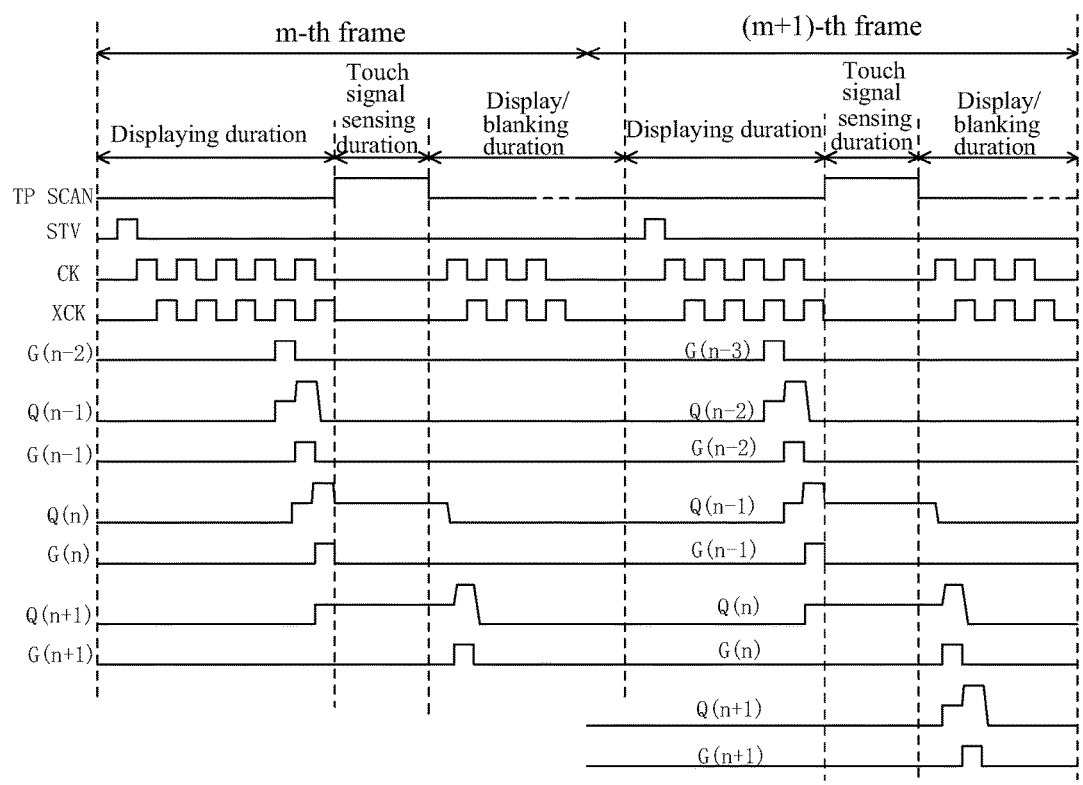
FIG. 6 is schematic view showing the operation timing of the driving method for in-cell type touch display panel provided by an embodiment of the present invention using a GOA circuit with a plurality of N-type TFTs as example.

Refer to FIG. 5 and FIG. 6. The present invention provides a driving method for in-cell type touch display panel, which comprises:

Step 1: providing an in-cell type touch display panel, the in-cell type touch display panel using a GOA circuit for gate scan driving, the GOA circuit comprising a plurality of cascade GOA units, as shown in FIG. 2, the GOA unit of each stage inputting a clock signal CK, an inverted clock signal XCK, and a constant voltage, and outputting a scan driver signal to the GOA unit of corresponding stage; specifically, the first stage GOA unit inputting a scan activation signal STV.

Each GOA unit may comprise a plurality of N-type TFTs or a plurality of P-type TFTs.

Take the GOA unit comprises a plurality of N-type TFTs as an example. As shown in FIG. 5, the constant voltage is a negative constant voltage VSS; as shown in FIG. 6, the scan activation signal SW comprises a single high level pulse.

Figure 3:
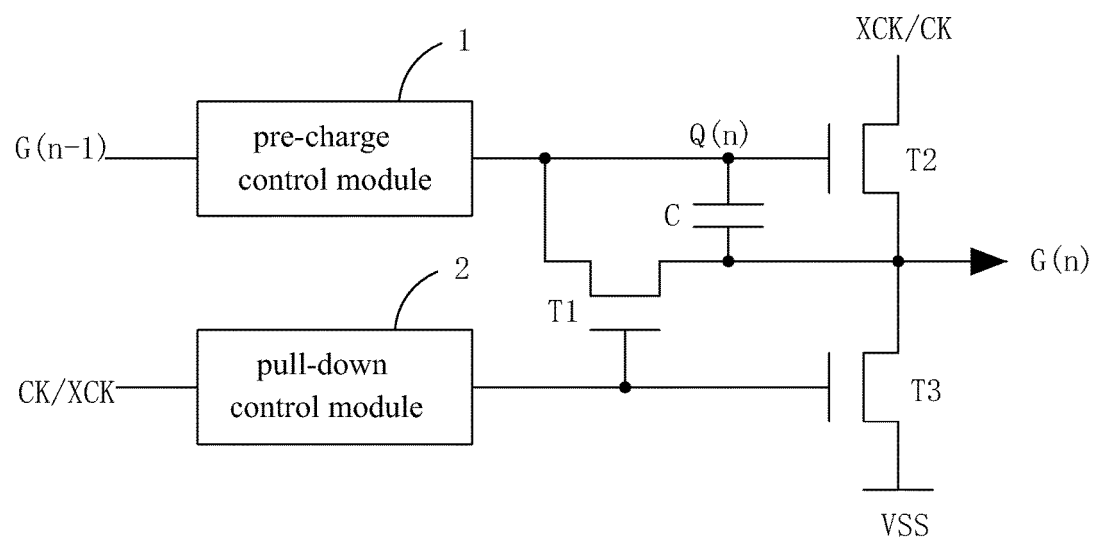
FIG. 3 is a schematic view showing the n-th stage GOA unit using a GOA circuit with a plurality of N-type TFTs as example.

Specifically, for a natural number n, the circuit of the n-th stage GOA unit is shown in FIG. 3, which comprises: a pre-charged control module 1, a pull-down control module 2, a first TFT T1, a second TFT T2, a third TFT T3, and a capacitor C. The pre-charged control module 1 has an input end connected to input the scan driver signal G(n−1) of the previous stage ((n−1)-th stage) GOA unit, an output end connected to the first node Q(n). The gate of the first TFT T1 is connected to an output end of the pull-down control module 2, the source is connected to the first node Q(n), and the drain is connected to the scan driver signal G(n) of the n-th stage GOA unit. The gate of the second TFT T2 is connected to the first node Q(n), and the drain is connected to the scan driver signal G(n) of the n-th stage GOA unit. The gate of the third TFT T3 is connected to the gate of the first TFT T1, the source is connected to the constant negative voltage VSS, and the drain is connected to the scan driver signal G(n) of the n-th stage GOA unit. One end of the capacitor C is connected to the first node Q(n) and the other connected to the scan driver signal G(n) of the n-th stage GOA unit. For any two GOA units of adjacent stages, one of the two GOA units has the input end of the pull-down control module 2 connected to the clock signal CK and the source of the second TFT T2 connected to the inverted clock signal XCK, while the other GOA unit has the input end of the pull-down control module 2 connected to the inverted clock signal XCK and the source of the second TFT T2 connected to the clock signal CK.

The pre-charged control module 1 is for charging the first node Q(n) to raise the voltage of the first node Q(n) to a high level when receiving a high scan driver signal G(n−1) outputted by the (n−1)-th stage GOA unit. The pull-down control module 2 is to control the conductivity of the first TFT T1 and the third TFT T3 to pull down the scan driver signal G(n) to low level, and then pull down to the constant negative voltage VSS.

Figure 4:
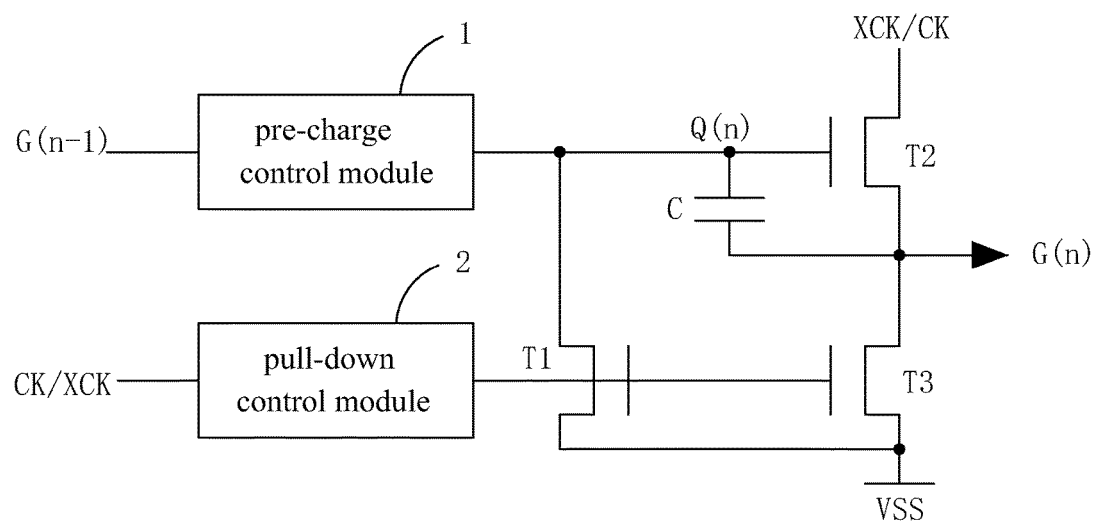
FIG. 4 is another schematic view showing the n-th stage GOA unit using a GOA circuit with a plurality of N-type TFTs as example.

The n-th stage GOA unit can also have the structure as shown in FIG. 4, wherein the drain of the first TFT is connected to the constant negative voltage VSS. When the pull-down control module 2 makes the first TFT T1 and the third TFT T3 conductive to pull down the scan driver signal G(n) to the constant negative voltage VSS directly. The remaining is the same as the structure in FIG. 3, and the description will not be repeated.

Step 2: for a natural number m, during displaying an m-th frame, setting a touch scan signal TP SCAN to turn on when an n-th stage GOA unit finishing outputting the scan driver signal G(n), the in-cell type touch display panel transiting from a display duration into a touch signal sensing duration.

Using also the GOA unit having a plurality of N-type TFTs as an example, as shown in FIG. 6, during displaying the m-th frame, the time at which the n-th stage GOA unit finishing outputting scan driver signal G(n) corresponds to the falling edge of the scan driver signal G(n) of the n-th stage GOA unit, and the touch scan signal TP SCAN is turned on when transiting from low level to high level. The clock signal and the inverted clock signal have a plurality of high level pulses during the display duration, and are pulled down to low level during the touch signal sensing duration.

Step 3: during displaying an (m+t)-th frame, setting a touch scan signal to turn on when a GOA unit of any stage other than the n-th stage finishing outputting the scan driver signal, the in-cell type touch display panel transiting from a display duration into a touch signal sensing duration.

Specifically, in step 3, the touch scan signal TP SCAN can be set to turn on when a GOA unit of any stage before the n-th stage finishing outputting the scan driver signal. Or, the touch scan signal TP SCAN can be set to turn on when a GOA unit of any stage after the n-th stage finishing outputting the scan driver signal.

Figure 1:
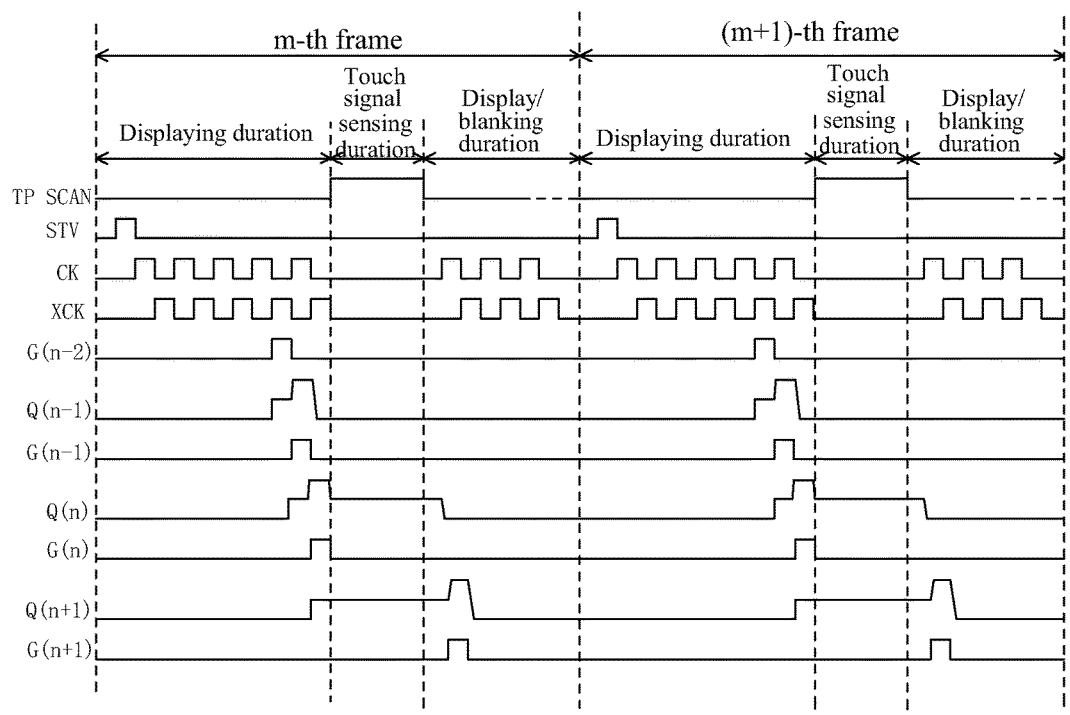
FIG. 1 is a schematic view showing the operation timing of the known driving method for in-cell type touch display panel using a GOA circuit with a plurality of N-type TFTs as example.

FIG. 6 uses GOA unit having a plurality of N-type TFTs as an example to show the displaying of (m+1)-th frame, wherein the touch scan signal TP SCAN is set to turn on when a GOA unit of the previous stage ((n−1)-th stage) finishing outputting the scan driver signal G(n−1). Furthermore, the time at which the (n−1)-th stage GOA unit finishing outputting scan driver signal G(n−1) corresponds to the falling edge of the scan driver signal G(n−1) of the (n−1)-th stage GOA unit, and the touch scan signal TP SCAN is turned on when transiting from low level to high level. The clock signal and the inverted clock signal have a plurality of high level pulses during the display duration, and are pulled down to low level during the touch signal sensing duration Compare FIG. 6 to FIG. 1. It is shown that in the known driving method for in-cell type touch display panel of FIG. 1, during displaying each frame, the touch scan signal TP SCAN is set to turn on when the n-th stage GOA unit finishing outputting the scan driver signal G(n). Therefore, after the touch scan signal TP SCAN rises to high level, the first node Q(n+1) of the (n+1)-th stage GOA unit stays at high level for a longer time, leading to extra stress on the TFTs in the (n+1) GOA unit and causing TFTs to age faster. In FIG. 6, during displaying the m-th frame, the touch scan signal TP SCAN is set to turn on when the n-th stage GOA unit finishing outputting the scan driver signal G(n). During display the (m+1)-th frame, the touch scan signal TP SCAN is set to turn on when the (n−1)-th stage GOA unit finishing outputting the scan driver signal G(n−1). Although the first node Q(n+1) of the (n+1)-th stage GOA unit stays at high level for a longer time, the first node Q(n+1) of the (n+1)-th stage GOA unit in the following (m+1)-th frame stays at high level for a shorter time, and the waveform recovery of the first node Q(n+1) is consistent with the first nodes of GOA units of other stages, except the GOA units of n-th stage and the (n+1)-th stage in the m-th frame. As such, the stress generated voltage waveform drag of the firsts node of a single stage GOA causing the TFTs in the GOA Unit is avoided so that the ageing extent of each GOA unit is uniform.

The above description of the driving method for in-cell type touch display panel is for GOA unit comprising a plurality of N-type TFTs. When the GOA unit comprises a plurality of P-type TFTs, the high and low level voltages are exchanged. For example, the constant voltage becomes a constant positive voltage, and the touch scan signal TP SCAN turns on when transiting from high level to low level. The scan activation signal STV comprises a single low level pulse. The clock signal CK and the inverted clock signal XCK comprise a plurality of low level pulses during displaying each frame, and are pulled up to high level during the touch signal sensing duration of each frame. The detailed description will not be repeated here.

In summary, the present invention provides a driving method for in-cell type touch display panel, for different frames, setting the touch scan signal to turn on when the GOA units of different stages finishing outputting scan driver to make the TFT in GOA unit of each stage withstanding the amount of voltage stress time and the ageing extent uniform to avoid any single stage ageing faster than the remaining to cause abnormal display in the known technologies.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A driving method for in-cell type touch display panel, which comprises:

Step 1: providing an in-cell type touch display panel, the in-cell type touch display panel using a GOA circuit for gate scan driving, the GOA circuit comprising a plurality of cascade GOA units, the GOA unit of each stage inputting a clock signal, an inverted clock signal, and a constant voltage, and outputting a scan driver signal to the GOA unit of corresponding stage; the first stage GOA unit inputting a scan activation signal;

Step 2: for natural numbers m and n, during displaying an m-th frame, setting a touch scan signal to turn on when an n-th stage GOA unit finishing outputting the scan driver signal, the in-cell type touch display panel transiting from a display duration into a touch signal sensing duration; and Step 3: during displaying an (m+1)-th frame, setting a touch scan signal to turn on when a GOA unit of any stage other than the n-th stage finishing outputting the scan driver signal, the in-cell type touch display panel transiting from a display duration into a touch signal sensing duration;

wherein each GOA unit of each stage comprises a plurality of N-type TFTs;

wherein the constant voltage is a constant negative voltage, the touch scan signal turns on when transiting from low level to high level, the scan activation signal comprises a single high level pulse, the clock signal and the inverted clock signal comprises a plurality of high level pulses during the display duration of each frame, and pulled down to low level during the touch signal sensing duration of each frame;

wherein the n-th stage GOA unit comprises: a pre-charged control module, a pull-down control module, a first TFT, a second TFT, a third TFT, and a capacitor;

the pre-charged control module having an input end connected to input the scan driver signal of the previous stage ((n−1)-th stage) GOA unit, an output end connected to a first node; the gate of the first TFT connected to an output end of the pull-down control module, the source connected to the first node, and the drain connected to the scan driver signal of the n-th stage GOA unit; the gate of the second TFT connected to the first node, the drain connected to the scan driver signal of the n-th stage GOA unit; the gate of the third TFT connected to the gate of the first TFT, the source connected to the constant voltage, and the drain connected to the scan driver signal of the n-th stage GOA unit; one end of the capacitor connected to the first node and the other connected to the scan driver signal of the n-th stage GOA unit; and for any two GOA units of adjacent stages, one of the two GOA units having the input end of the pull-down control module connected to the clock signal and the source of the second TFT connected to the inverted clock signal, while the other GOA unit having the input end of the pull-down control module connected to the inverted clock signal and the source of the second TFT connected to the clock signal.

2. A driving method for in-cell type touch display panel, which comprises:

Step 1: providing an in-cell type touch display panel, the in-cell type touch display panel using a GOA circuit for gate scan driving, the GOA circuit comprising a plurality of cascade GOA units, the GOA unit of each stage inputting a clock signal, an inverted clock signal, and a constant voltage, and outputting a scan driver signal to the GOA unit of corresponding stage; the first stage GOA unit inputting a scan activation signal;

Step 2: for natural numbers in and n, during displaying an m-th frame, setting a touch scan signal to turn on when an n-th stage GOA unit finishing outputting the scan driver signal, the in-cell type touch display panel transiting from a display duration into a touch signal sensing duration; and Step 3: during displaying an (m+1)-th frame, setting a touch scan signal to turn on when a GOA unit of any stage other than the n-th stage finishing outputting the scan driver signal, the in-cell type touch display panel transiting from a display duration into a touch signal sensing duration;

wherein each GOA unit of each stage comprises a plurality of P-type TFTs;

wherein the constant voltage is a constant positive voltage, the touch scan signal turns on when transiting from high level to low level, the scan activation signal comprises a single low level pulse, the clock signal and the inverted clock signal comprises a plurality of low level pulses during the display duration of each frame, and pulled up to high level during the touch signal sensing duration of each frame;

wherein the n-th stage GOA unit comprises: a pre-charged control module, a pull-down control module, a first TFT, a second TFT, a third TFT, and a capacitor;

the pre-charged control module having an input end connected to input the scan driver signal of the previous stage ((n−1)-th stage) GOA unit, an output end connected to a first node; the gate of the first TFT connected to an output end of the pull-down control module, the source connected to the first node, and the drain connected to the scan driver signal of the n-th stage GOA unit; the gate of the second TFT connected to the first node, the drain connected to the scan driver signal of the n-th stage GOA unit; the gate of the third TFT connected to the gate of the first TFT, the source connected to the constant voltage, and the drain connected to the scan driver signal of the n-th stage GOA unit; one end of the capacitor connected to the first node and the other connected to the scan driver signal of the n-th stage GOA unit; and for any two GOA units of adjacent stages, one of the two GOA units having the input end of the pull-down control module connected to the clock signal and the source of the second TFT connected to the inverted clock signal, while the other GOA unit having the input end of the pull-down control module connected to the inverted clock signal and the source of the second TFT connected to the clock signal.

3. The driving method for in-cell type touch display panel as claimed in claim 1, wherein in Step 3, the touch scan signal is set to turn on when a GOA unit of any stage that is located before the n-th stage finishes outputting the scan driver signal.

4. The driving method for in-cell type touch display panel as claimed in claim 1, wherein in Step 3, the touch scan signal is set to turn on when a GOA unit of any stage that is located after the n-th stage finishes outputting the scan driver signal.

5. The driving method for in-cell type touch display panel as claimed in claim 3, wherein in Step 3, the touch scan signal is set to turn on when a GOA unit of the previous stage ((n−1)-th stage) before the n-th stage finishes outputting the scan driver signal.

6. A driving method for in-cell type touch display panel, which comprises:

Step 1: providing an in-cell type touch display panel, the in-cell type touch display panel using a GOA circuit for gate scan driving, the GOA circuit comprising a plurality of cascade GOA units, the GOA unit of each stage inputting a clock signal, an inverted clock signal, and a constant voltage, and outputting a scan driver signal to the GOA unit of corresponding stage; the first stage GOA unit inputting a scan activation signal;

Step 2: for natural numbers m and n, during displaying an m-th frame, setting a touch scan signal to turn on when an n-th stage GOA unit finishing outputting the scan driver signal, the in-cell type touch display panel transiting from a display duration into a touch signal sensing duration; and Step 3: during displaying an (m+1)-th frame, setting a touch scan signal to turn on when a GOA unit of any stage other than the n-th stage finishing outputting the scan driver signal, the in-cell type touch display panel transiting from a display duration into a touch signal sensing duration;

wherein the GOA unit of each stage comprises a plurality of N-type TFTs;

wherein in Step 3, the touch scan signal is set to turn on when a GOA unit of any stage that is located before the n-th stage finishes outputting the scan driver signal;

wherein in Step 3, the touch scan signal is set to turn on when a GOA unit of the previous stage ((n−1)-th stage) before the n-th stage finishing outputting the scan driver signal;

wherein the constant voltage is a constant negative voltage, the touch scan signal turns on when transiting from low level to high level, the scan activation signal comprises a single high level pulse, the clock signal and the inverted clock signal comprises a plurality of high level pulses during the display duration of each frame, and pulled down to low level during the touch signal sensing duration of each frame; and wherein the n-th stage GOA unit comprises: a pre-charged control module, a pull-down control module, a first TFT, a second TFT, a third TFT, and a capacitor;

the pre-charged control module having an input end connected to input the scan driver signal of the previous stage ((n−1)-th stage) GOA unit, an output end connected to a first node; the gate of the first TFT connected to an output end of the pull-down control module, the source connected to the first node, and the drain connected to the scan driver signal of the n-th stage GOA unit; the gate of the second TFT connected to the first node, the drain connected to the scan driver signal of the n-th stage GOA unit; the gate of the third TFT connected to the gate of the first TFT, the source connected to the constant voltage, and the drain connected to the scan driver signal of the n-th stage GOA unit; one end of the capacitor connected to the first node and the other connected to the scan driver signal of the n-th stage GOA unit; and for any two GOA units of adjacent stages, one of the two GOA units having the input end of the pull-down control module connected to the clock signal and the source of the second TFT connected to the inverted clock signal, while the other GOA unit having the input end of the pull-down control module connected to the inverted clock signal and the source of the second TFT connected to the clock signal.

7. The driving method for in-cell type touch display panel as claimed in claim 2, wherein in Step 3, the touch scan signal is set to turn on when a GOA unit of any stage before the n-th stage finishes outputting the scan driver signal.

8. The driving method for in-cell type touch display panel as claimed in claim 2, wherein in Step 3, the touch scan signal is set to turn on when a GOA unit of any stage that is located after the n-th stage finishes outputting the scan driver signal.

9. The driving method for in-cell type touch display panel as claimed in claim 7, wherein in Step 3, the touch scan signal is set to turn on when a GOA unit of the previous stage ((n−1)-th stage) before the n-th stage finishes outputting the scan driver signal.

* * * * *